Figures 1, 2:
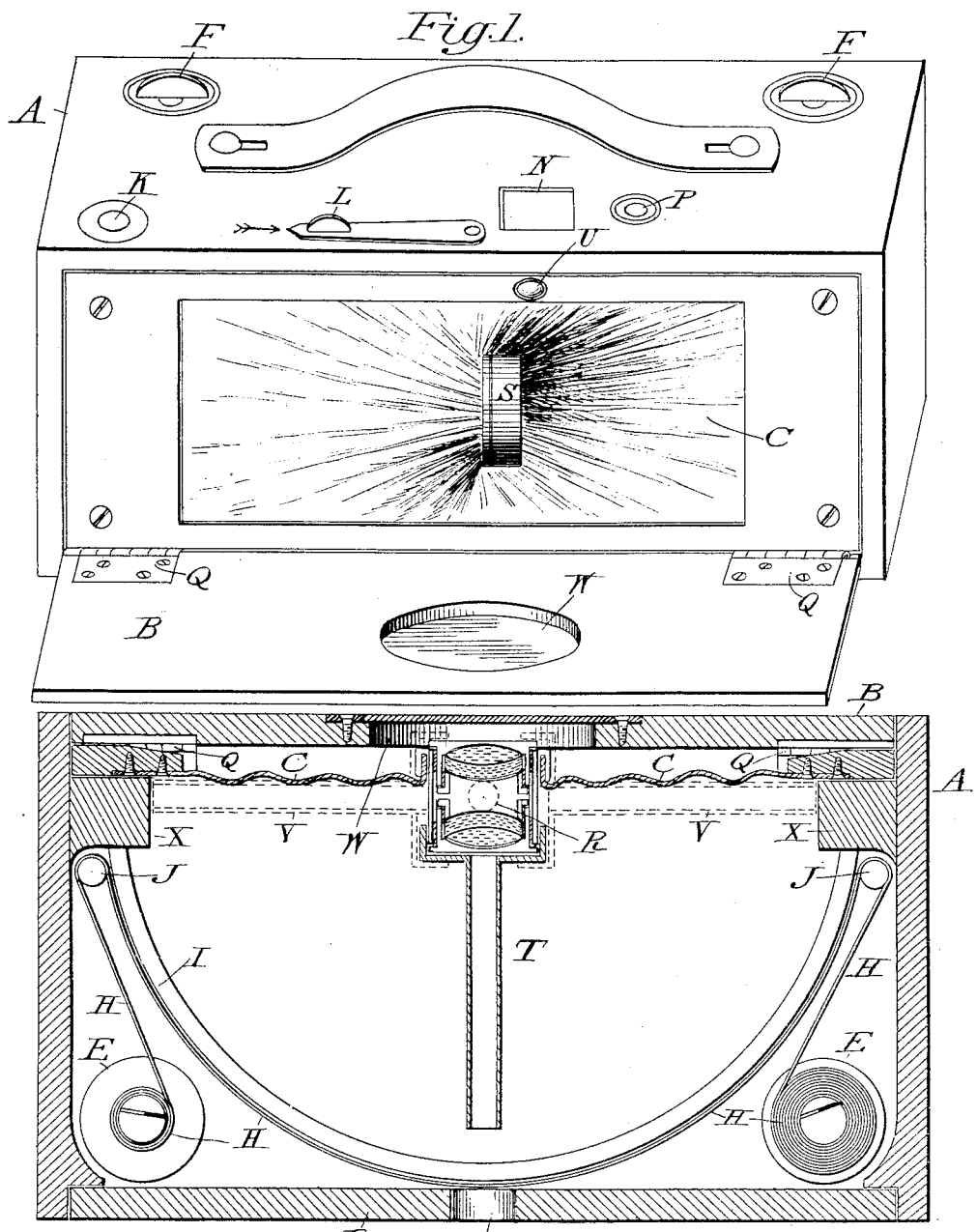

No. 694,923. Patented Mar. 4, 1902.
D. H. HOUSTON.
PANORAMIC PHOTOGRAPHIC CAMERA.
(Application filed Aug. 24, 1899.)
(No Model.)

Witnesses: Inventor.
David Henderson Houston

UNITED STATES PATENT OFFICE.

DAVID HENDERSON HOUSTON, OF HUNTER, NORTH DAKOTA.

PANORAMIC PHOTOGRAPHIC CAMERA.

SPECIFICATION forming part of Letters Patent No. 694,923, dated March 4, 1902.

Application filed August 24, 1899. Serial No. 728,394. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Panoramic Photographic Cameras; and I do hereby declare the following to be a full, clear, and exact description of the invention, such as will enable others skilled in the art to which it appertains to make and use the same.

My invention relates to photographic cameras, and has for its object the provision of a panoramic camera adapted to use the rolls of sensitized film on the market.

An object of my invention is to provide an improved panoramic camera having an outer protective front adjusted to fold outward and downward.

Another object of my invention is to produce a panoramic camera having a combination of parts adapted to economize space and provide a rectangular panoramic camera wherein the supply-spool and the reel-spool are pivoted in what would be otherwise waste space in the rear interior corners of the casing, the camera-casing having an outer protective front adjusted to fold outward and downward, and thereby expose the lens to the scene to be photographed.

My invention consists in novel features of construction and combination of parts, which are hereinafter fully described, and the novel features pointed out in the claims at the end of this specification.

Figure 1 is a perspective view of the complete camera with the outer protective front folded outward and downward. Fig. 2 is a horizontal sectional plan view taken through the center of the camera when the outer protective front is closed.

In the drawings, in which similar characters of reference denote similar parts in all figures, A represents the camera-casing; B, the outer protective front; C, the inner flexible front; D, the camera-back; E, the spools; F, the spool-keys; H, the sensitized film; I, the lower circularly-positioned film-guide; J, the guide-rollers; K, the push-button; L, the set-lever; N, the view-finder; P, the level; Q, the hinges of the outer protective front.

R shows the position at which the lens-mount is pivoted.

At S is shown the cap of the lens-mount.

At T is shown the slot-like extension of the lens-mount.

At U is shown the finder-lens.

At V are shown dotted lines which indicate the right and left hand positions of the extension of the lens-mount when the same is swung to right or left.

At X are shown corner-blocks.

At Y is shown the observation-aperture in the camera-back.

To prepare the camera for use, the operator removes the back of the camera and then places an ordinary spool of cartridge-film into the right interior rear corner of the camera-casing and connects the spool with the interior end of the spool-key F, and also upon a lower spool-centering pivot-pin, (not shown,) and then passes the end of the wrapper of the film around the right-hand guide-roller, and then rearward around the circularly-positioned film-guides, and then forward around the left-hand guide-roller, and then rearward and attaches it to the reel-spool and then replaces the camera-back.

To operate the camera, wind the left-hand reel-spool until the first indicia-mark upon the wrapper of the sensitized film appears opposite to the observation-aperture at the rear of the camera. Then turn the set-lever to the arrow-mark and open the outer protective front, and, holding the camera level and steady where the view desired will show in the finder, then press the push-button and the lens-mount and lens will rotate at the optical center of the lens by force of a spring, (not shown, but connected to the axis at R.)

Having described my invention, I claim—

1. In a panoramic camera the combination of a suitable rectangular casing having an outer protective front adapted to fold outward and downward, a pivoted lens and mount in said casing, said mount having a rearward slot-like extension, an inner flexible front surrounding said pivoted lens-mount, said flexible front being connected to the rectangular casing and lens-mount, circularly-positioned guides for the film, said guides adapted to guide a sensitized film in the focal field of the pivoted lens.

2. In a panoramic camera the combination of a suitable rectangular casing having an outer protective front adapted to fold outward and downward, a pivoted lens and mount in said casing, an inner flexible front surrounding said pivoted lens-mount, said flexible front connected to the rectangular casing and lens-mount, guide-rollers positioned near to the right and left interior front corners of the casing, a supply-spool and a reel-spool for the sensitized film, said supply and reel spools being positioned in the triangular space at the right and left interior rear corners of the casing, and a guide for the sensitized film positioned circularly in the rear of the pivoted lens.

In testimony whereof I affix my signature in presence of two witnesses.

DAVID HENDERSON HOUSTON.

Witnesses:
J. H. GALE,
C. D. FIELD.